United States Patent
Lee

(10) Patent No.: US 10,986,274 B2
(45) Date of Patent: Apr. 20, 2021

(54) ACTUATOR OF CAMERA MODULE

(71) Applicant: Samsung Electro-Mechanics Co., Ltd., Suwon-si (KR)

(72) Inventor: Jong Woo Lee, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 142 days.

(21) Appl. No.: 16/443,902

(22) Filed: Jun. 18, 2019

(65) Prior Publication Data

US 2020/0149877 A1 May 14, 2020

(30) Foreign Application Priority Data

Nov. 13, 2018 (KR) .......... 10-2018-0138842

(51) Int. Cl.
| | | |
|---|---|---|
| *G02B 27/64* | (2006.01) | |
| *H04N 5/232* | (2006.01) | |
| *G03B 17/02* | (2021.01) | |
| *G01D 5/14* | (2006.01) | |

(52) U.S. Cl.
CPC ......... *H04N 5/23287* (2013.01); *G01D 5/145* (2013.01); *G02B 27/646* (2013.01); *G03B 17/02* (2013.01); *G03B 2205/0069* (2013.01)

(58) Field of Classification Search
CPC ........... H04N 5/23287; H04N 5/23264; H04N 17/002; H04N 2201/0084; G02B 27/646; G02B 7/09; G02B 7/04; G02B 7/02; G02B 7/28; G03B 17/02; G03B 2205/0069; G03B 3/10; G03B 13/32; G03B 13/34; G03B 13/36
See application file for complete search history.

(56) References Cited

U.S. PATENT DOCUMENTS

| | | | |
|---|---|---|---|
| 5,932,984 A | * 8/1999 | Murakami | G02B 27/646 |
| | | | 318/268 |
| 2005/0258822 A1 | 11/2005 | Hara et al. | |
| 2013/0194587 A1 | 8/2013 | Tabuchi et al. | |
| 2016/0315573 A1 | 10/2016 | Kang | |

FOREIGN PATENT DOCUMENTS

| | | |
|---|---|---|
| JP | 4587708 B2 | 11/2010 |
| JP | 2013-125048 A | 6/2013 |
| KR | 10-2016-0126915 A | 11/2016 |

* cited by examiner

*Primary Examiner* — Clayton E. LaBalle
*Assistant Examiner* — Fang-Chi Chang
(74) *Attorney, Agent, or Firm* — NSIP Law

(57) ABSTRACT

An actuator of a camera module includes a position detector configured to generate a feedback signal based on a detected position of a lens barrel; and a driver configured to drive the lens barrel based on a difference between an input signal indicating a target position of the lens barrel and the feedback signal, wherein the driver includes a signal adjuster configured to calculate an offset between the target position of the lens barrel and an actual position of the lens barrel, and apply the input signal to a calibration function based on the offset to generate a calibrated input signal.

14 Claims, 5 Drawing Sheets

ACTUATOR OF CAMERA MODULE

CROSS-REFERENCE TO RELATED APPLICATIONS

This application claims the benefit under 35 USC 119(a) of Korean Patent Application No. 10-2018-0138842 filed on Nov. 13, 2018, in the Korean Intellectual Property Office, the entire disclosure of which is incorporated herein by reference for all purposes.

BACKGROUND

1. Field

This application relates to an actuator of a camera module.

2. Description of Related Art

Generally, portable communications terminals, such as mobile phones, personal digital assistants (PDAs), and portable personal computers (PCs), have been designed to transmit image data as well as text data and voice data. Accordingly, a camera module is typically installed in a portable communication terminal to enable the transmission of image data and the use of a video chat function.

A camera module typically includes a lens barrel including lenses, a housing in which the lens barrel is accommodated, and an image sensor for converting an image of an object into an electrical signal. A fixed-focus camera module that images an object at a fixed focus may be employed. Recently, a camera module including an actuator capable of autofocusing has been developed and used. Also, a camera module may include an actuator for optical image stabilization to reduce image quality degradation caused by shaking of a user's hand. To accurately control an autofocusing function and an optical image stabilization function employed in a camera module, an offset between an actual position and a target position of the lens barrel and an offset between an actual position and a detected position of the lens barrel may need to be appropriately calibrated.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an actuator of a camera includes a position detector configured to generate a feedback signal based on a detected position of a lens barrel; and a driver configured to drive the lens barrel based on a difference between an input signal indicating a target position of the lens barrel and the feedback signal, wherein the driver includes a signal adjuster configured to calculate an offset between the target position of the lens barrel and an actual position of the lens barrel, and apply the input signal to a calibration function based on the offset to generate a calibrated input signal.

The signal adjuster may include an offset calculator configured to calculate the offset based on the target position of the lens barrel and the actual position of the lens barrel.

The signal adjuster may further include a linear calibrator configured to divide the input signal into a plurality of sections, and generate a respective calibration function for each of the plurality of sections.

The plurality of sections may have a same size.

The plurality of sections of the input signal may be determined based on a division code.

A digital code of the calibrated input signal corresponding to the division code may be determined based on the offset.

The digital code of the calibrated input signal corresponding to the division code may be selected from a predetermined lookup table.

The calibration function may be generated based on two-dimensional coordinates determined based on the division code and the digital code of the calibrated input signal corresponding to the division code.

The calibration function may be a linear function.

In another general aspect, an actuator of a camera module includes a position detector configured to generate a feedback signal based on a detected position of a lens barrel; and a driver configured to drive the lens barrel based on a difference between an input signal indicating a target position of the lens barrel and the feedback signal, wherein the driver includes a signal adjuster configured to generate a sectional linear calibration function based on either one or both of an offset between the target position of the lens barrel and an actual position of the lens barrel, and an offset between the detected position of the lens barrel and the actual position of the lens barrel.

The signal adjuster may include an offset calculator configured to calculate either one or both of the offset between the target position of the lens barrel and the actual position of the lens barrel based on the target position of the lens barrel and the actual position of the lens barrel, and the offset between the detected position of the lens barrel and the actual position of the lens barrel based on the detected position of the lens barrel and the actual position of the lens barrel.

The signal adjuster may include a linear calibrator configured to apply either one or both of the input signal and the feedback signal to the sectional linear calibration function.

The linear calibrator may include a single subtractor, a single multiplier, and a single adder.

The signal adjuster may include a linear calibrator configured to generate the sectional linear calibration function by dividing a basic function defined by either one or both of the input signal and the feedback signal into a plurality of sections and generating a respective calibration function for each of the plurality of sections.

The calibration function may be a linear function.

The plurality of sections may have a same size.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1:
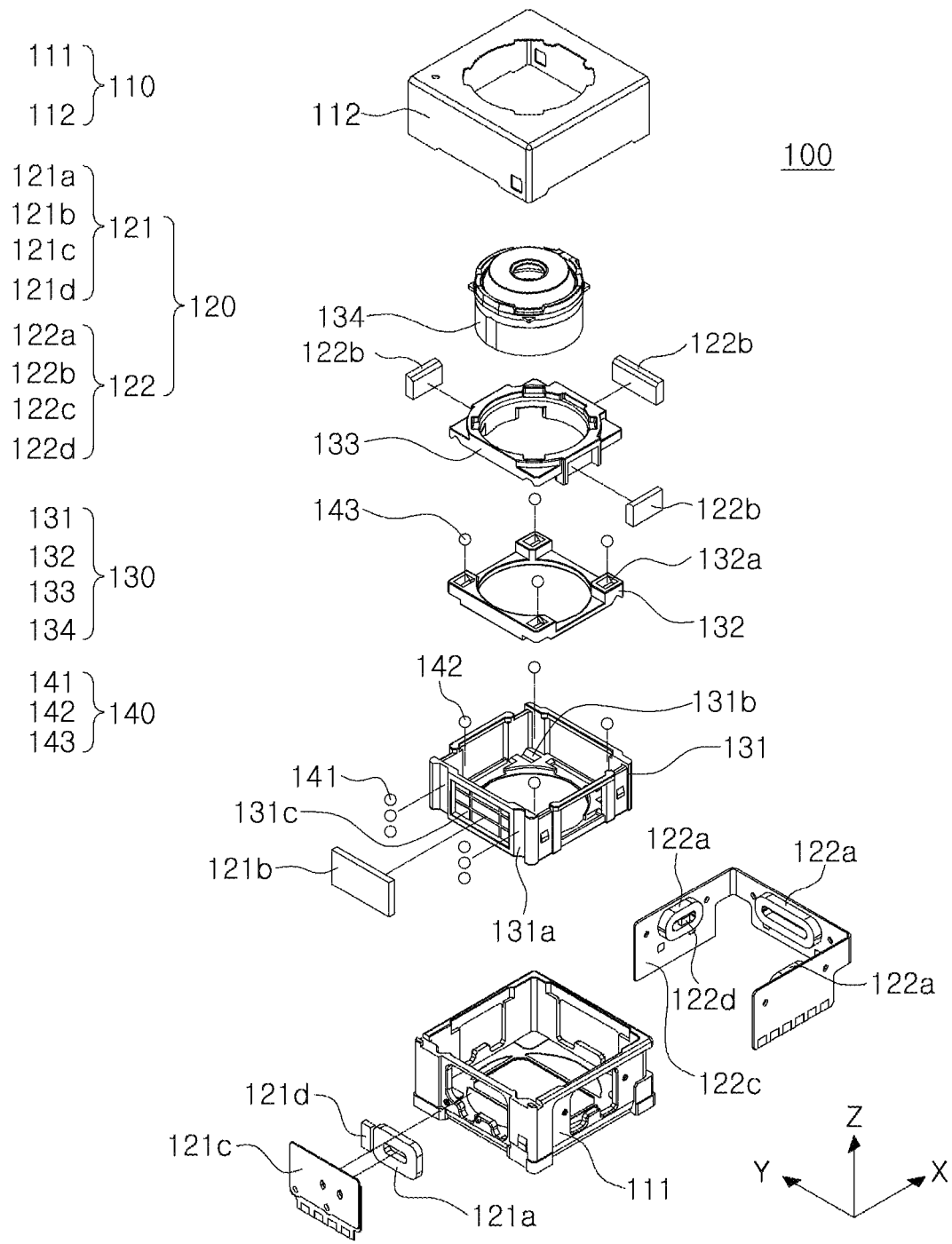
FIG. 1 is an exploded perspective diagram of an example of a camera module.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

FIG. 1 is an exploded perspective diagram of an example of a camera module.

Referring to FIG. 1, a camera module 100 includes a housing assembly 110, an actuator 120, a lens module 130, and a ball bearing set 140.

The camera module 100 has either one or both of an autofocusing function and an optical image stabilization function. As an example, the lens module 130 moves in an optical axis direction and a direction perpendicular to the optical axis direction in the housing assembly 110 for the camera module 100 to perform an autofocusing function and an optical image stabilization function.

The housing assembly 110 includes a housing 111 and a shield case 112. The housing 111 may be made of a material that can be easily molded. As an example, the housing 111 may be made of a plastic material. The housing 111 includes at least one actuator 120. For example, a portion of a first actuator 121 may be mounted on a first side surface of the housing 111, and a portion of a second actuator 122 may be mounted on second to fourth side surfaces of the housing 111. The housing 111 is configured to receive a lens module 130 therein. As an example, a space in which the lens module 130 is completely or partially accommodated is formed in the housing 111.

The housing 111 has six surfaces with openings. As an example, a hole for an image sensor is formed in a bottom surface of the housing 111, and a quadrangular hole for mounting the lens module 130 is formed in a top surface of the housing 111. Further, a first side surface of the housing 111 has an opening into which a first driving coil 121a of the first actuator 121 is inserted, and second to fourth side surfaces of the housing 111 each have an opening in to which a respective one of three second driving coils 122a of the second actuator 122 is inserted.

The shield case 112 is configured to cover a portion of the housing 111. As an example, the shield case 112 is configured to cover the top surface and the four side surfaces of the housing 111. Alternatively, the shield case 112 is configured to only cover the four side surfaces of the housing 111, or is configured to partially cover the top surface and the four side surfaces of the housing 111. The shield case 112 shields electromagnetic waves generated while the camera module is driven. When the camera module is driven, electromagnetic waves are generated, and when electromagnetic waves are radiated externally, the electromagnetic waves may affect other electronic components and may cause communication failure or malfunctions. To prevent this, the shield case 112 is made of a metal material and is grounded to a ground pad of a substrate mounted on the bottom surface of the housing 111, thereby shielding the electromagnetic waves.

A plurality of the actuators 120 are provided. As an example, the actuator 120 includes the first actuator 121 configured to move the lens module 130 in a Z-axis direction, and a second actuator 122 configured to move the lens module 130 in an X-axis direction and a Y-axis direction.

The first actuator 121 is mounted on the housing 111 and a first frame 131 of the lens module 130. As an example, a portion of the first actuator 121 is mounted on a first side surface of the housing 111, and the other portion of the first actuator 121 is mounted on a first side surface 131c of the first frame 131. The first actuator 121 moves the lens module 130 in an optical axis direction, which is the Z-axis direction. As an example, the first actuator 121 includes a first driving coil 121a, a first magnet 121b, a first substrate 121c, and a first position detector 121d. The first driving coil 121a and the first position detector 121d are disposed on the first substrate 121c. The first substrate 121c is mounted on the first side surface of the housing 111, and the first magnet 121b is mounted on the first side surface 131c of the first frame 131 facing the first substrate 121c.

A first driver (not illustrated) providing a driving signal to the first driving coil 121a is disposed on the first substrate 121c. The first driver applies a driving signal to the first driving coil 121a and to provide a driving force to the first magnet 121b. The first driver may include a driver integrated circuit (driver IC) providing the driving signal to the first driving coil 121a. For example, when the driving signal from the first driver is provided to the first driving coil 121a, a magnetic field is generated by the first driving coil 121a, and the magnetic field generated by the first driving coil 121a interacts with a magnetic field of the first magnet 121b, causing a driving force enabling relative movement of the first frame 131 and a lens barrel 134 with respect to the housing 111 to be generated according to Fleming's left hand rule. The first driver includes an H-bridge circuit that is driven bidirectionally, and applies the driving signal to the first driving coil 121a.

The lens barrel 134 moves in the same direction in which the first frame 131 moves by movement of the first frame 131. The first actuator 121 senses a strength of the magnetic field of the first magnet 121b using the first position detector 121d, and detects positions of the first frame 131 and the lens barrel 134. As an example, the first position detector 121d includes a Hall sensor.

The second actuator 122 is mounted on the housing 111 and a third frame 133 of the lens module 130. As an example, one portion of the second actuator 122 is mounted on second to fourth side surfaces of the housing 111, and the other portion of the second actuator 122 is mounted on second to fourth side surfaces of the third frame 133. Alternatively, one portion of the second actuator 122 is mounted on portions of second to fourth sides of the housing 111, and the other portion of the second actuator is mounted on portions of second to fourth side surfaces of the third frame 133.

The second actuator 122 includes a component for moving the lens module 130 in a direction perpendicular to an optical axis direction. As an example, the second actuator 122 includes three second driving coils 122a, three second magnets 122b, a second substrate 122c, and one or more second position detectors 122d.

The three second driving coils 122a and the one or more second position detectors 122d are disposed on the second substrate 122c. The second substrate 122c has an approximately quadrangular shape with one open side, and surrounds second to fourth side surfaces of the housing 111. The three second magnets 122b are mounted on second to fourth side surfaces of the third frame 133 and face the second substrate 122c.

A second driver (not illustrated) providing driving signals to the second driving coils 122a is disposed on the second substrate 122c. The second driver applies the driving signals to the second driving coils 122a to provide driving forces to the second magnets 122b. The second driver may include a driver integrated circuit (driver IC) providing the driving signals to the second driving coils 122a. For example, when the driving signal from the second drivers are provided to the second driving coils 122a, magnetic fields are generated by the second driving coils 122a, and the magnetic fields generated by the second driving coils 122a interact with magnetic fields of the second magnets 122b. The second driver changes a magnitude and a direction of a magnetic force generated between the three second driving coils 122a and the three second magnets 122b to enable relative movement of a second frame 132 or the third frame 133 with respect to the first frame 131. The second driver includes H-bridge circuits that are driven bidirectionally, and applies the driving signals to the second driving coils 122a.

The lens barrel 134 moves in the same direction in which the second frame 132 or the third frame 133 moves by movement of the second frame 132 or the third frame 133. The second actuator 122 senses the strength of the magnetic field of one or more of the second magnets 122b using the one or more second position detectors 122d and detects positions of the lens barrel 134 and the second and third frames 132 and 133. As an example, each of the one or more second position detectors 122d includes a Hall sensor.

The lens module 130 is mounted in the housing assembly 110. As an example, the lens module 130 accommodated in a space formed by the housing 111 and the shield case 112 so that the lens module 130 is able to move in three axis directions. The lens module 130 includes a plurality of frames. As an example, the lens module 130 includes the first frame 131, the second frame 132, and the third frame 133.

The first frame 131 is configured to move with respect to the housing 111. As an example, the first frame 131 is moved in an optical axis direction (a Z-axis direction) of the housing 111 by the first actuator 121. The first frame 131 includes a plurality of guiding grooves 131a and 131b. As an example, the first guiding grooves 131a extending in the optical axis direction (the Z-axis direction) are formed on a first side surface of the first frame 131, and the second guiding grooves 131b extending in a first direction (a Y-axis direction) perpendicular to the optical axis direction are formed in four corners of an inside bottom surface of the first frame 131. The first frame 131 has at least three open side surfaces. As an example, second to fourth side surfaces of the first frame 131 are open to enable the second magnets 122b mounted on the third frame 133 to face the second driving coils 122a mounted on the housing 111.

The second frame 132 is disposed in the first frame 131. As an example, the second frame 132 is disposed in an internal space of the first frame 131. The second frame 132 is configured to move in the first direction (the Y-axis direction) perpendicular to the optical axis direction with respect to the first frame 131. For example, the second frame 132 moves in the first direction (the Y-axis direction) perpendicular to the optical axis direction along the second guiding grooves 131b of the first frame 131. A plurality of guiding grooves 132a are formed in the second frame 132. As an example, four guiding grooves 132a extending in a second direction (an X-axis direction) perpendicular to the optical axis direction are formed in the corners of the second frame 132.

The third frame 133 is disposed in the second frame 132. As an example, the third frame 133 is mounted on an upper surface of the second frame 132. The third frame 133 is configured to move in the second direction (the X-axis direction) perpendicular to the optical axis direction with respect to the second frame 132. As an example, the third frame 133 moves in the second direction (the X-axis direction) perpendicular to the optical axis direction along the guiding grooves 132a of the second frame 132. The second magnets 122b are mounted on the third frame 133. As an example, three second magnets 122b are mounted on second to fourth side surfaces of the third frame 133, respectively. As another example, two second magnets 122b are mounted on two of the second to fourth side surfaces of the third frame 133, respectively. The lens module 130 includes the lens barrel 134. For example, the lens module 130 includes the lens barrel 134 including one or more lenses. The lens barrel 134 has a hollow cylindrical shape enabling at least one lens for imaging an object to be disposed in the lens barrel 134, and the at least one lens is disposed in the lens barrel 134 along an optical axis. The number of lenses disposed in the lens barrel 134 may vary depending on a design of the lens barrel 134, and the lenses may have optical characteristics such as the same refractive index or different refractive indices.

The lens barrel 134 is mounted on the third frame 133. As an example, the lens barrel 134 is coupled to the third frame 133 and moves together with the third frame 133. The lens barrel 134 is configured to move in an optical axis direction (Z-axis direction) and a direction perpendicular to the optical axis direction (an X axis direction and a Y axis direction). As an example, the lens barrel 134 is moved in the optical axis direction (the Z-axis direction) by the first actuator 121, and is moved in the direction perpendicular to the optical axis direction (the X axis direction and the Y axis direction) by the second actuator 122.

The ball bearing set 140 guides the movement of the lens module 130. As an example, the ball bearing set 140 is configured so that the lens module 130 is able to smoothly move in the optical axis direction and the direction perpendicular to the optical axis direction. The ball bearing set 140 includes first ball bearings 141, second ball bearings 142, and third ball bearings 143. As an example, the first ball bearings 141 are disposed in the first guiding grooves 131a of the first frame 131, and enable the first frame 131 to smoothly move in an optical axis direction. As another example, the second ball bearings 142 are disposed in the second guiding grooves 131b of the first frame 131, and enable the second frame 132 to smoothly move in a first direction perpendicular to the optical axis direction. As another example, the third ball bearings 143 are disposed in the third guiding grooves 132a of the second frame 132, and enable the third frame 133 to smoothly move in a second direction perpendicular to the optical axis direction.

The first and second ball bearings 141 and 142 each include at least three ball bearings, and the at least three ball bearings of each of the first and second ball bearings are disposed in the first guiding grooves 131a and the second guiding grooves 131b.

Each portion in which the ball bearing set 140 is disposed may be filled with a lubricant material for reducing friction and noise. As an example, a viscous fluid may be injected into the guiding grooves 131a, 131b, and 132a. As the viscous fluid, grease having good viscosity and lubricating properties may be used.

Figure 2:
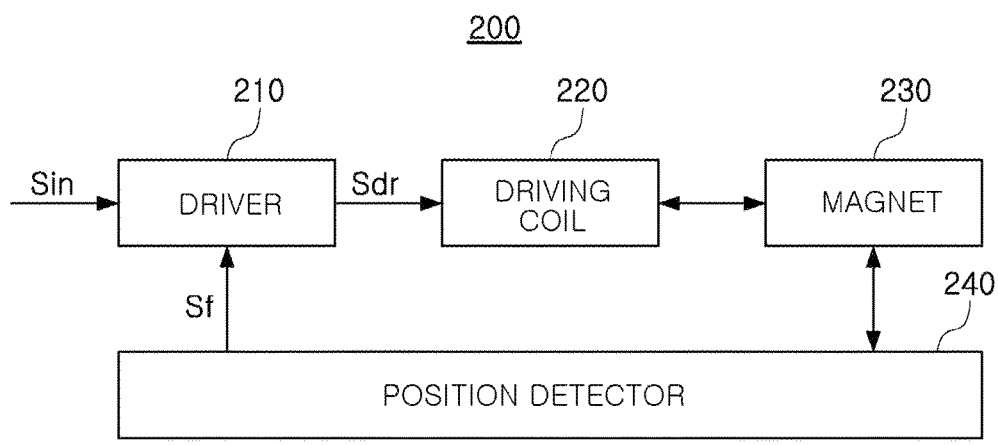
FIG. 2 is a block diagram illustrating a main portion of an actuator of the camera module of FIG. 1.

FIG. 2 is a block diagram illustrating an example of a main portion of an actuator employed in a camera module according to an example embodiment. An actuator 200 illustrated in FIG. 2 may correspond to the first actuator 121 and the second actuator 122 illustrated in FIG. 1. That is, each of the first actuator 121 and the second actuator 122 illustrated in FIG. 1 may be implemented by the actuator 200 illustrated in FIG. 2.

When the actuator 200 illustrated in FIG. 2 corresponds to the first actuator 121 illustrated in FIG. 1, the actuator 200 the lens barrel 134 in FIG. 1 in an optical axis direction to perform an autofocusing function of a camera module. Thus, when the actuator 200 in FIG. 2 performs an autofocusing function, a driver 210 applies a driving signal to a driving coil 220 to provide a driving force acting in the optical axis direction to a magnet 230.

Also, when the actuator 200 in FIG. 2 corresponds to the second actuator 122 illustrated in FIG. 1, the actuator 200 moves the lens barrel 134 in FIG. 1 in a direction perpendicular to the optical axis to perform an optical image stabilization (OIS) function of the camera module. Thus, when the actuator 200 performs an OIS function, the driver 210 applies a driving signal to the driving coil 220 to provide a driving force acting in the direction perpendicular to the optical axis direction to the magnet 230.

The actuator 200 includes the driver 210, the driving coil 220, the magnet 230, and a position detector 240.

The driver 210 generates a driving signal Sdr based on an input signal Sin input from an external device and a feedback signal Sf generated by the position detector 240, and provides the generated driving signal Sdr to the driving coil 220. The input signal Sin represents a target position of the lens barrel 134 in FIG. 1.

When the driving signal Sdr provided from the driver 210 is applied to the driving coil 220, the lens barrel 134 moves in one direction by a magnetic interaction between the driving coil 220 and the magnet 230. The position detector 240 detects a detected position of the magnet 230 moving by the magnetic interaction of the driving coil 220 and the magnet 230, generates the feedback signal Sf, and provides the feedback signal Sf to the driver 210.

When the feedback signal Sf is provided to the driver 210, the driver 210 compares the input signal Sin with the feedback signal Sf and generates a new driving signal Sdr. Thus, the driver 210 is driven based on a closed-loop system in which the input signal Sin is compared with the feedback signal Sf. The driver 210 based on a closed-loop system is driven while reducing an error of a target position included in the input signal Sin and an error of a detected position determined in the feedback signal Sf. The driving operation based on the closed-loop system has an improved linearity, accuracy, and repeatability compared to an open-loop system.

The driver 210 may include an H-bridge circuit that is driven bidirectionally, and applies a driving signal to the driving coil 220.

Figure 3:
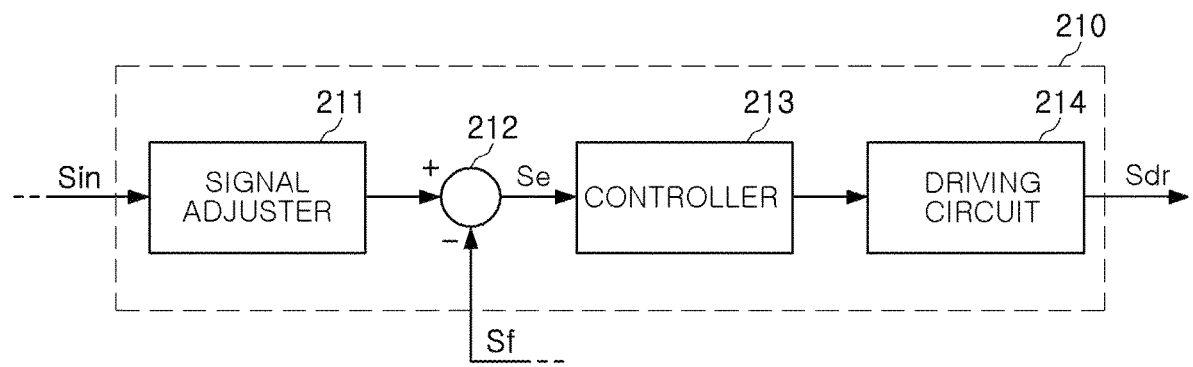
FIGS. 3 and 4 are block diagrams illustrating examples of a driver of FIG. 2.
Figure 4:
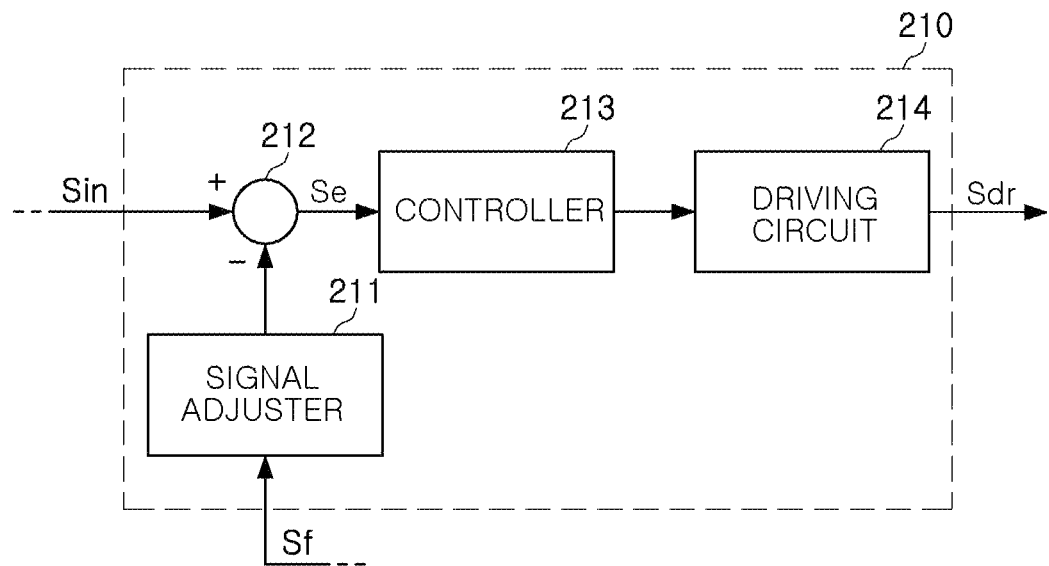

FIGS. 3 and 4 are block diagrams illustrating examples of the driver of FIG. 2.

The driver 210 includes a signal adjuster 211, a subtractor 212, a controller 213, and a driving circuit 214.

The signal adjuster 211 adjusts a level of either one or both of an input signal Sin and a feedback signal Sf.

Referring to FIG. 3, the signal adjuster 211 adjusts a level of the input signal Sin, and calibrates an offset between a target position of the lens barrel 134 in FIG. 1 represented by the input signal Sin and an actual position of the lens barrel 134 when the input signal Sin is provided. In another example, referring to FIG. 4, the signal adjuster 211 adjusts a level of the feedback signal Sf and calibrates an offset between a detected position of the lens barrel 134 represented by the feedback signal Sf and an actual position of the lens barrel 134 when the feedback signal Sf is provided.

FIGS. 3 and 4 illustrate examples in which the signal adjuster 211 adjusts a level of either the input signal Sin or the feedback signal Sf. However, in another example, the signal adjuster 211 both a level of the input signal Sin and a level of the feedback signal Sf. The specific operations of the signal adjuster 211 will be described later with reference to FIG. 5.

The subtractor 212 subtracts the feedback signal Sf provided from the signal adjuster 211 from the input signal Sin to obtain an error value Se. Conceptually, the subtractor 212 compares a target position of the lens barrel 134 represented by the input signal Sin with a detected position of the lens barrel 134 represented by the feedback signal Sf, and calculates an error value Se representing a difference between the target position and the detected position. A moving distance and a moving direction of the lens barrel 134 are determined based on the error value Se calculated by the subtractor 212.

The controller 213 applies a control gain to the error value Se provided from the subtractor 212 and generates a control signal. As an example, the controller 213 is a proportional-integral-derivative (PID) controller, and performs a PID-based control. The controller 213 performs a control operation proportional to the error value Se in a current state under a proportional control, performs a control operation for reducing an error in a steady state under an integral control, and performs a control operation for reducing an overshoot by preventing a rapid change in the control signal under a derivative control.

The PID-based control performed by the controller 213 may be represented by Equation 1 below. In Equation 1, $K_P$ denotes a proportional control gain, $K_I$ denotes an integral control gain, and $K_D$ denotes a derivative control gain.

$$u(t) = K_P e(t) + K_I \int e(t)dt + K_D \frac{de(t)}{dt} \quad (1)$$

When the controller 213 performs the PID-based control, the controller 213 applies the proportional control gain $K_P$, the integral control gain $K_I$, and the derivative control gain $K_D$ to the error value Se, which represents a difference between a target position of the lens barrel 134 and a detected position of the lens barrel 134, thereby generating a control signal.

The driving circuit 214 generates the driving signal Sdr based on the control signal provided from the controller 213. The lens barrel 134 moves to a target position in response to the driving signal Sdr generated by the driving circuit 214. In one example, the driving circuit 214 includes an H-bridge circuit, which is driven bidirectionally, and applies a driving signal to the driving coil 220 based on a voice coil motor system. When the driving circuit 214 is driven based on a voice coil motor system, the control signal provided from the controller 213 is applied to a gate of a switching device included in the H-bridge circuit.

Figure 5:
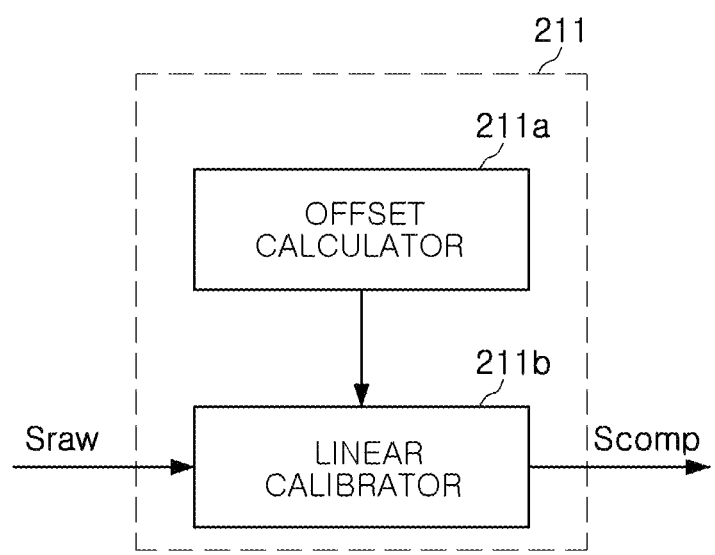
FIG. 5 is a block diagram illustrating an example of a signal adjuster of FIGS. 3 and 4.
Figure 6:
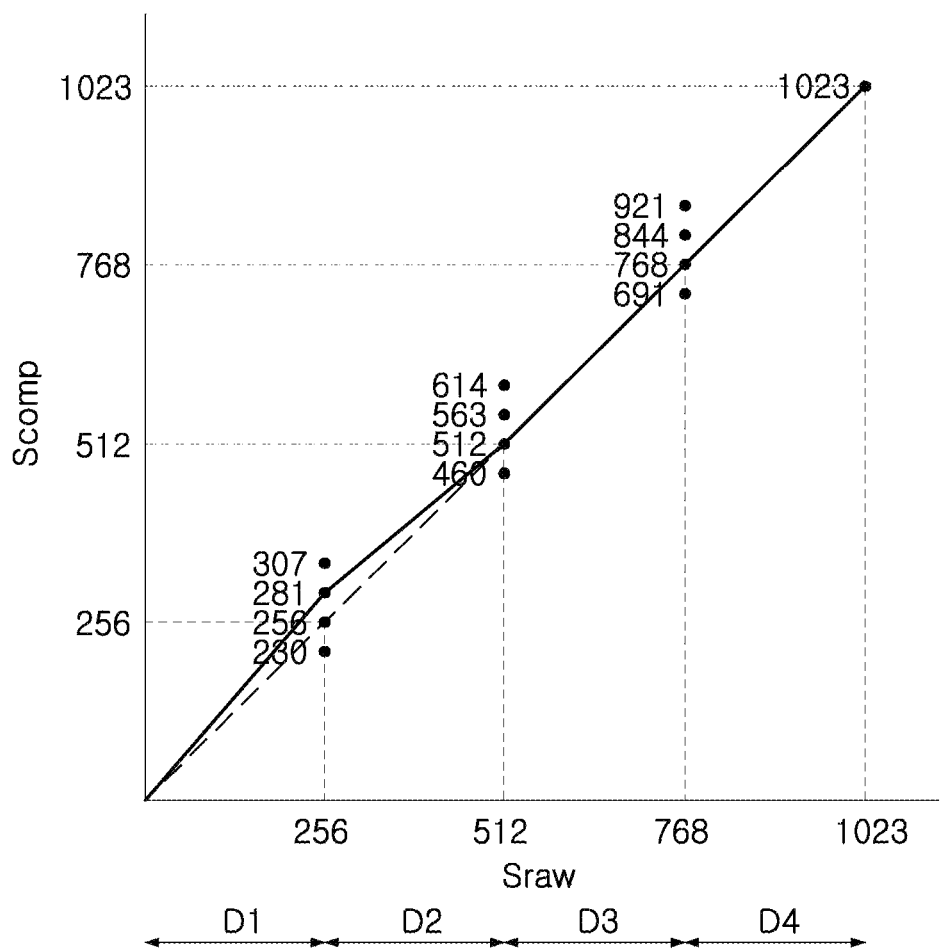
FIG. 6 is a graph illustrating an example of a signal adjusting method of the signal adjuster of FIG. 5.

FIG. 5 is a block diagram illustrating an example of the signal adjuster of FIGS. 3 and 4. FIG. 6 is a graph illustrating an example of a signal adjusting method of the signal adjuster of FIG. 5.

Referring to FIG. 5, the signal adjuster 211 includes an offset calculator 211a and a linear calibrator 211b.

The offset calculator 211a calculates an offset between a target position of a lens barrel represented by the input signal Sin and an actual position of the lens barrel when the input signal Sin is provided. As an example, when an overall range of the input signal Sin is input, the offset calculator 211a calculates an offset by comparing a target position of the lens barrel with an actual position of the lens barrel.

The offset calculator 211a calculates an offset between a detected position of the lens barrel represented by the feedback signal Sf and an actual position of the lens barrel. As an example, when an overall range of an input signal Sin is input, and an overall range of a feedback signal Sf is generated, the offset calculator 211a calculates an offset by comparing a detected position of the lens barrel with an actual position of the lens barrel.

The offset calculator 211a divides an overall range of a base signal Sraw into a plurality of sections, and calculates an offset for each of the plurality of divided sections.

As an example, the offset calculator 211a divides an overall range of the base signal Sraw into four sections, and calculates an offset for each of the four divided sections. When it is assumed that the base signal Sraw is configured to be a 10-bit digital code, the 10-bit digital code is divided by the same interval. As an example, a first section D1 of the four divided sections of the base signal Sraw is 0 to 255, a second section D2 is 256 to 511, a third section D3 is 512 to 767, and a fourth section D4 is 768 to 1023. The offset calculator 211a calculates an offset for each of the first to fourth sections D1 to D4.

The linear calibrator 211b calibrates offsets of the input signal Sin and the feedback signal Sf in accordance with an offset provided from the signal adjuster 211. In the description below, the input signal Sin and the feedback signal Sf calibrated by the signal adjuster 211 will be referred to as the base signal Sraw for ease of description. Thus, the linear calibrator 211b calibrates an offset of the base signal Sraw and generates a calibrated signal Scomp.

The linear calibrator 211b generates a sectional linear calibration function including a calibration function for each of the plurality of sections provided from the offset calculator 211a in accordance with an offset of each of the plurality of sections.

In the description below, an example in which the base signal Sraw is implemented as a 10-bit digital code, the offset calculator 211a divides an overall range of the base signal Sraw into four sections and calculates an offset for each of the four divided sections, and the linear calibrator 211b generates a calibration function for each of the four sections will be described. As described above, as for the four divided sections of the base signal Sraw, the first section D1 is 0 to 255, the second section D2 is 256 to 511, the third section D3 is 512 to 767, and the fourth section is 768 to 1023.

The linear calibrator 211b determines a digital code of the calibrated signal Scomp corresponding to a level of a digital code that divides the base signal Sraw into the four sections D1 to D4 based on an offset of each of the plurality of sections.

Among the four sections of the base signal Sraw, the first section D1 is 0 to 255, the second section D2 is 256 to 511, the third section D3 is 512 to 767, and the fourth section is 768 to 1023, and thus division codes for dividing the four sections D1 to D4 are codes 256, 512, and 768.

The linear calibrator 211b determines digital codes of the calibrated signal Scomp corresponding to a first division code Code_div1=256, a second division code Code_div2=512, and a third division code Code_div3=768 of the base signal Sraw. As an example, the linear calibrator 211b determines the digital codes Code_Scomp of the calibrated signal corresponding to the first to third division codes Code_div1 to Code_div3 using a predetermined lookup table. As an example, the linear calibrator 211b determines the digital codes Code_Scomp of the calibrated signal corresponding to the first to third division codes Code_div1 to Code_div3 based on Table 1 below. In Table 1, first to third control values CV1 to CV3 are determined based on an offset of each of the sections D1 to D3 provided from the offset calculator 211a.

TABLE 1

| Code_div1 | | Code_div2 | | Code_div3 | |
|---|---|---|---|---|---|
| CV1 | Code_Scomp1 | CV2 | Code_Scomp2 | CV3 | Code_Scomp3 |
| 0 | 230 | 0 | 460 | 0 | 691 |
| 1 | 256 | 1 | 512 | 1 | 768 |
| 2 | 281 | 2 | 563 | 2 | 844 |
| 3 | 307 | 3 | 614 | 3 | 921 |

Referring to Table 1 above, when the first control value CV1 is 0, the digital code Code_Scomp1 of the calibrated signal corresponding to the first division code Code_div1=256 is determined to be 230. When the first control value CV1 is 1, the digital code Code_Scomp1 of the calibrated signal corresponding to the first division code Code_div1=256 is determined to be 256. When the first control value CV1 is 2, the digital code Code_Scomp1 of the calibrated signal corresponding to the first division code Code_div1=256 is determined to be 281. When the first control value CV1 is 3, the digital code Code_Scomp1 of the calibrated signal corresponding to the first division code Code_div1=256 is determined to be 307. Similar explanations are applicable to the digital code Code_Scomp2 of the calibrated signal corresponding to the second division code Code_div2=512, and the digital code Code_Scomp3 of the calibrated signal corresponding to the third division code Code_div3=768.

When the digital codes Code_Scomp of the calibrated signal corresponding to the first division code Code_div1, the second division code Code_div2, and the third division code Code_div3 of the base signal Sraw are determined, the linear calibrator 211b generates a calibration function for each of the sections of the base signal Sraw. The calibration function is calculated as a linear function.

As an example, when the base signal Sraw is assigned to an X axis, and the calibrated signal Scomp is assigned to a Y axis, the linear calibrator 211b calculates a linear function defining a line passing through two-dimensional coordinates of (0, 0) and (Code_div1, Code_Scomp1) in the first section D1, calculates a linear function defining a line passing through two-dimensional coordinates of (Code_div1, Code_Scomp1) and (Code_div2, Code_Scomp2) in the second section D2, calculates a linear function defining a line passing through two-dimensional coordinates of (Code_div2, Code_Scomp2) and (Code_div3, Code_Scomp3) in the third section D3, and calculates a linear function defining a line passing through two-dimensional coordinates of (Code_div3, Code_Scomp3) and (1024, 1024) in the fourth section D4.

The calibration functions of the first section D1 to the fourth section D4 may be expressed by Equation 2 below.

$$Code\_Scomp\_ = G*(Sraw\_code - Factor1) + Factor2 \quad (2)$$

When the digital codes Sraw_code of the base signal Sraw corresponding to the first section D1 to the fourth section D4 are input, the digital codes Code_Scomp of the calibrated signal are calculated according to Equation 2.

In the description below, a method of determining a slope G, a first factor Factor1, and a second factor Factor2 of Equation 2 will be described in detail with reference to Tables 2 to 6 that appear below.

Table 2 below lists a slope G of the first section D1 in accordance with a selected first control value CV1.

TABLE 2

| CV1 | D1 |
|---|---|
| 0 | 0.9 |
| 1 | 1.0 |
| 2 | 1.1 |
| 3 | 1.2 |

Referring to FIG. 2, when the first control value CV1 is 0, a slope G of the first section D1 is determined to be 0.9. When the first control value CV1 is 1, a slope G of the first section D1 is determined to be 1.0. When the first control value CV1 is 2, a slope G of the first section D1 is determined to be 1.1. When the first control value CV1 is 3, a slope G of the first section D1 is determined to be 1.2.

Table 3 below lists a slope G of the second section D2 in accordance with a selected first control value CV1 and a selected second control value CV2.

TABLE 3

| CV1 | CV2 | D2 |
|---|---|---|
| 0 | 0 | 0.9 |
|   | 1 | 1.1 |
|   | 2 | 1.3 |
|   | 3 | 1.5 |
| 1 | 0 | 0.8 |
|   | 1 | 1.0 |
|   | 2 | 1.2 |
|   | 3 | 1.4 |
| 2 | 0 | 0.7 |
|   | 1 | 0.9 |
|   | 2 | 1.1 |
|   | 3 | 1.3 |
| 3 | 0 | 0.6 |
|   | 1 | 0.8 |
|   | 2 | 1.0 |
|   | 3 | 1.2 |

Referring to Table 3, when the first control value is 0 and the second control value CV2 is 0, a slope G of the second section D2 is determined to be 0.9. When the first control value is 0 and the second control value CV2 is 1, a slope G of the second section D2 is determined to be 1.1. When the first control value is 0 and the second control value CV2 is 2, a slope G of the second section D2 is determined to be 1.3. When the first control value is 0 and the second control value CV2 is 3, a slope G of the second section D2 is determined to be 1.5. Similar explanations are applicable to the examples in which the first control value CV1 is 1, 2, and 3.

Table 4 below lists a slope G of the third section D3 in accordance with a selected second control value CV2 and a selected third control value CV3.

TABLE 4

| CV2 | CV3 | D3 |
|---|---|---|
| 0 | 0 | 0.9 |
|  | 1 | 1.2 |
|  | 2 | 1.5 |
|  | 3 | 1.8 |
| 1 | 0 | 0.7 |
|  | 1 | 1.0 |
|  | 2 | 1.3 |
|  | 3 | 1.6 |
| 2 | 0 | 0.5 |
|  | 1 | 0.8 |
|  | 2 | 1.1 |
|  | 3 | 1.4 |
| 3 | 0 | 0.3 |
|  | 1 | 0.6 |
|  | 2 | 0.9 |
|  | 3 | 1.2 |

Referring to Table 4, when the second control value CV2 is 0 and the third control value CV3 is 0, a slope G of the third section D3 is determined to be 0.9. When the second control value CV2 is 0 and the third control value CV3 is 1, a slope G of the third section D3 is determined to be 1.2. When the second control value CV2 is 0 and the third control value CV3 is 2, a slope G of the third section D3 is determined to be 1.5. When the second control value CV2 is 0 and the third control value CV3 is 3, a slope G of the third section D3 is determined to be 1.8. Similar explanations are applicable to the examples in which the second control value CV2 is 1, 2, and 3.

Table 5 below lists a slope G of the fourth section D4 in accordance with a selected third control value CV3.

TABLE 5

| CV3 | D4 |
|---|---|
| 0 | 1.301 |
| 1 | 1.000 |
| 2 | 0.699 |
| 3 | 0.398 |

Referring to Table 5, when the third control value CV3 is 0, a slope G of the fourth section D4 is determined to be 1.301. When the third control value CV3 is 1, a slope G of the fourth section D4 is determined to be 1.000. When the third control value CV3 is 2, a slope G of the fourth section D4 is determined to be 0.699. When the third control value CV3 is 3, a slope G of the fourth section D4 is determined to be 0.398.

Table 6 below lists a first factor Factor1 for each of the first to fourth sections D1 to D4.

TABLE 6

|  | Factor1 |
|---|---|
| D1 | 0 |
| D2 | 256 |
| D3 | 512 |
| D4 | 768 |

Referring to Table 6, the first factor Factor1 is determined to be 0 in the first section D1, 256 in the second section D2, 512 in the third section D3, and 768 in the fourth section D4.

Table 7 below lists a second factor Factor2 for each of the first to fourth sections D1 to D4 in accordance with first to third control values CV1 to CV3.

TABLE 7

| | Factor2 | | | |
|---|---|---|---|---|
| CV1~CV3 | D1 | D2 | D3 | D4 |
| 0 | 0 | 230 | 460 | 691 |
| 1 | 0 | 256 | 512 | 768 |
| 2 | 0 | 281 | 563 | 844 |
| 3 | 0 | 307 | 614 | 921 |

Referring to Table 7, when each of the first to third control values CV1 to CV3 is 0, the second factor Factor2 is 0 in the first section D1, 230 in the second section D2, 460 in the third section D3, and 691 in the fourth section D4. When each of the first to third control values CV1 to CV3 is 1, the second factor Factor2 is 0 in the first section D1, 256 in the second section D2, 512 in the third section D3, and 768 in the fourth section D4. When each of the first to third control values CV1 to CV3 is 2, the second factor Factor2 is 0 in the first section D1, 281 in the second section D2, 563 in the third section D3, and 844 in the fourth section D4. When each of the first to third control values CV1 to CV3 is 3, the second factor Factor2 is 0 in the first section D1, 307 in the second section D2, 614 in the third section D3, and 921 in the fourth section D4.

When the slope G, the first factor Factor1, and the second factor Factor2 in the first section D1 to the fourth section D4 are determined in accordance with the first to third control values CV1 to CV3, the digital codes Code_Scomp of the calibrated signal corresponding to the digital code Sraw_code of the base signal Sraw are calculated according to Equation 2.

Referring to Equation 2, the linear calibrator 211b may be implemented in hardware by a single subtractor, a single multiplier, and a single adder to calculate Equation 2 so that the calibrated signal Scomp may be swiftly calculated based on the base signal Sraw without a complex calculation process.

In the aforementioned example, the signal adjuster 211 includes the offset calculator 211a and the linear calibrator 211b, generates a calibration function based on a calculated offset, and applies the base signal Sraw to the generated calibration function, thereby calculating the calibrated signal Scomp. However, in another example, the signal adjuster 211 calculates an offset in the process of manufacturing a camera module, programs a calibration function based on the calculated offset in each camera module, and applies the base signal Sraw to the programmed calibration function during the operation of the camera module, thereby calculating the calibrated signal Scomp. Thus, the operation of calculating an offset using the offset calculator 211a and the operation of generating a calibration function using the linear calibrator 211b may be performed only once when a camera module is manufactured.

Figure 7:
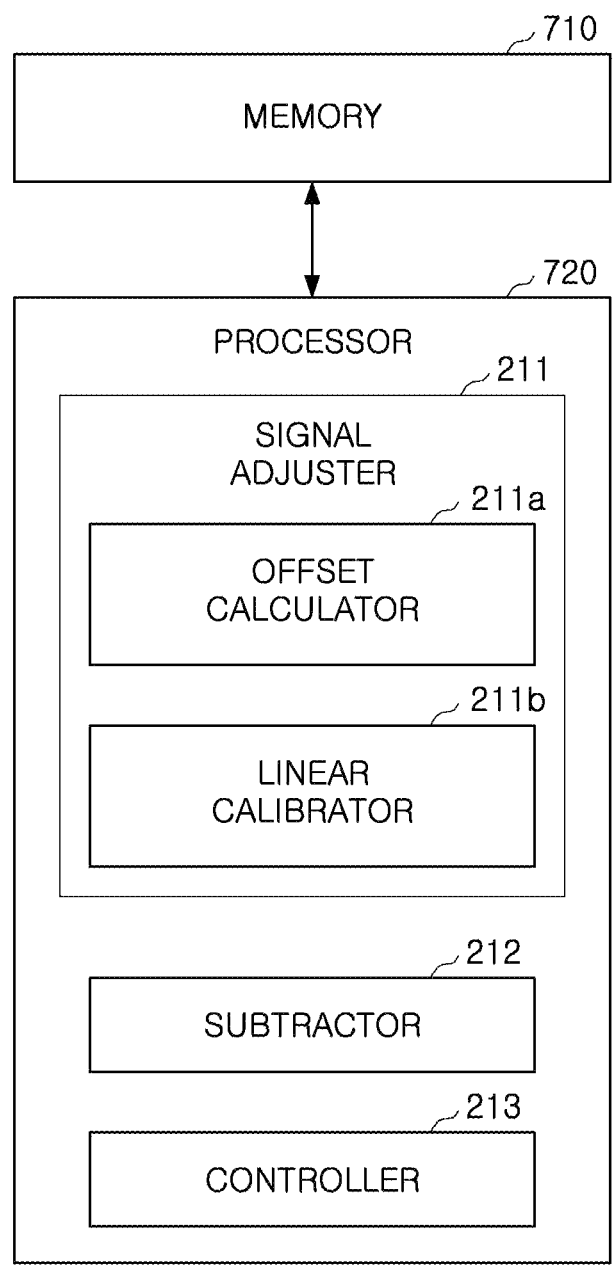
FIG. 7 is a block diagram illustrating an example of the signal adjuster of FIGS. 3 to 5, a subtractor and a controller of FIGS. 3 and 4, and an offset calculator and a linear calibrator of FIG. 5.

FIG. 7 is a block diagram illustrating an example of the signal adjuster of FIGS. 3 to 5, a subtractor and a controller of FIGS. 3 and 4, and an offset calculator and a linear calibrator of FIG. 5.

Referring to FIG. 7, a memory 710 stores instructions that, when executed by a processor 720, cause the processor 720 to perform the functions of the signal adjuster 211 of FIGS. 3 to 5, the subtractor 212 and the controller 213 of FIGS. 3 and 4, and the offset calculator 211a and the linear calibrator 211*b* of FIG. 5. Thus, the processor 720 includes the signal adjuster 211, the offset calculator 211*a*, and the linear calibrator 211*b*, the subtractor 212, the controller 213.

In the aforementioned examples, a camera module is accurately controlled by calibrating an offset between an actual position and a target position of the lens barrel and an offset between an actual position and a detected position of the lens barrel.

Also, by simplifying the configuration of hardware of the linear calibrator of a camera module, an offset may be swiftly calibrated without a complex calculation process.

The signal adjuster 211 in FIGS. 3 to 5, the subtractor 212 and the controller 213 in FIGS. 3 and 4, and the offset calculator 211*a* and the linear calibrator 211*b* in FIG. 5 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, transistors, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods described with reference to FIGS. 1 to 6 that perform the operations described in this application are performed by hardware components, or by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An actuator of a camera module, the actuator comprising:
   a position detector configured to generate a feedback signal based on a detected position of a lens barrel; and
   a driver configured to drive the lens barrel based on a difference between an input signal indicating a target position of the lens barrel and the feedback signal,
   wherein the driver comprises a signal adjuster configured to calculate an offset between the target position of the lens barrel and an actual position of the lens barrel, and apply the input signal to a calibration function based on the offset to generate a calibrated input signal, and
   wherein the signal adjusted comprises:
      an offset calculator configured to calculate the offset based on the target position of the lens barrel and the actual position of the lens barrel; and
      a linear calibrator configured to divide the input signal into a plurality of sections, and generate a respective calibration function for each of the plurality sections.

2. The actuator of a camera module of claim 1, wherein the plurality of sections have a same size.

3. The actuator of a camera module of claim 1, wherein the plurality of sections of the input signal are determined based on a division code.

4. The actuator of a camera module of claim 3, wherein a digital code of the calibrated input signal corresponding to the division code is determined based on the offset.

5. The actuator of a camera module of claim 4, wherein the digital code of the calibrated input signal corresponding to the division code is selected from a predetermined lookup table.

6. The actuator of a camera module of claim 3, wherein the calibration function is generated based on two-dimensional coordinates determined based on the division code and the digital code of the calibrated input signal corresponding to the division code.

7. The actuator of a camera module of claim 1, wherein the calibration function is a linear function.

8. An actuator of a camera module, the actuator comprising:
   a position detector configured to generate a feedback signal based on a detected position of a lens barrel; and
   a driver configured to drive the lens barrel based on a difference between an input signal indicating a target position of the lens barrel and the feedback signal,
   wherein the driver comprises a signal adjuster configured to generate a sectional linear calibration function based on either one or both of an offset between the target position of the lens barrel and an actual position of the lens barrel, and an offset between the detected position of the lens barrel and the actual position of the lens barrel.

9. The actuator of a camera module of claim 8, wherein the signal adjuster comprises an offset calculator configured to calculate either one or both of the offset between the target position of the lens barrel and the actual position of the lens barrel based on the target position of the lens barrel and the actual position of the lens barrel, and the offset between the detected position of the lens barrel and the actual position of the lens barrel based on the detected position of the lens barrel and the actual position of the lens barrel.

10. The actuator of a camera module of claim 8, wherein the signal adjuster comprises a linear calibrator configured to apply either one or both of the input signal and the feedback signal to the sectional linear calibration function.

11. The actuator of a camera module of claim 10, wherein the linear calibrator comprises a single subtractor, a single multiplier, and a single adder.

12. The actuator of a camera module of claim 8, wherein the signal adjuster comprises a linear calibrator configured to generate the sectional linear calibration function by dividing a basic function defined by either one or both of the input signal and the feedback signal into a plurality of sections and generating a respective calibration function for each of the plurality of sections.

13. The actuator of a camera module of claim 12, wherein the calibration function is a linear function.

14. The actuator of a camera module of claim 12, wherein the plurality of sections have a same size.

* * * * *